(12) United States Patent
Challener et al.

(10) Patent No.: US 7,587,765 B2
(45) Date of Patent: *Sep. 8, 2009

(54) AUTOMATIC VIRUS FIX

(75) Inventors: David Carroll Challener, Raleigh, NC (US); Richard W. Cheston, Morrisville, NC (US); Daryl Carvis Cromer, Apex, NC (US); Mark Charles Davis, Durham, NC (US); Howard Jeffrey Locker, Cary, NC (US); Randall Scott Springfield, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 875 days.

This patent is subject to a terminal disclaimer.

(21) Appl. No.: 10/827,165

(22) Filed: Apr. 16, 2004

(65) Prior Publication Data

US 2005/0138159 A1 Jun. 23, 2005

Related U.S. Application Data

(63) Continuation-in-part of application No. 10/745,173, filed on Dec. 23, 2003, now abandoned.

(51) Int. Cl.
*G06F 11/00* (2006.01)

(52) U.S. Cl. .............................. 726/24; 726/22; 726/23; 713/187; 713/188

(58) Field of Classification Search ........................ None
See application file for complete search history.

(56) References Cited

U.S. PATENT DOCUMENTS 5,485,575 A 1/1996 Chess et al.

(Continued)

FOREIGN PATENT DOCUMENTS

JP 2001 154970 A1 6/2001

(Continued)

OTHER PUBLICATIONS

Locker, H.J. et al, "Backup Master Boot Record for Virus Recovery." *Research Disclosure* Mar. 1999, p. 387.

(Continued)

*Primary Examiner*—Pramila Parthasarathy
(74) *Attorney, Agent, or Firm*—Jason O. Piche, Esq.; Steven M. Greenberg, Esq.; Carey Rodriguez Greenberg & Paul LLP

(57) ABSTRACT

A client computer is connected via a network to an anti-virus server. A signal from the anti-virus server notifies the client computer that an anti-virus needs to be immediately downloaded from the anti-virus server. The client computer disengages from the network, and re-establishes a link with only the trusted anti-virus server. The anti-virus fix is installed, the client computer re-booted, and the client computer is then allowed to reconnect to the full network. If the client's primary operating system (OS) is infected, a secondary OS in the client computer performs the anti-virus download and execution. The disengagement from the network is performed by applying a filter in a network interface card (NIC) driver by the primary OS, the secondary OS, a service processor (SP), or by a virtual machine manager (VMM), depending on which is available at the client computer.

31 Claims, 13 Drawing Sheets

U.S. PATENT DOCUMENTS

| | | |
|---|---|---|
| 5,559,960 A | 9/1996 | Lettvin |
| 5,842,002 A | 11/1998 | Schnurer et al. |
| 5,948,104 A * | 9/1999 | Gluck et al. .................. 726/24 |
| 6,892,241 B2 * | 5/2005 | Kouznetsov et al. ........ 709/229 |
| 6,966,059 B1 * | 11/2005 | Shetty et al. ................ 717/172 |
| 7,188,369 B2 * | 3/2007 | Ho et al. ....................... 726/24 |
| 2002/0116542 A1 | 8/2002 | Tarbotton et al. |
| 2002/0116639 A1 | 8/2002 | Chefalas et al. |
| 2003/0046558 A1 | 3/2003 | Teblyashkin et al. |
| 2003/0065793 A1 | 4/2003 | Kouznetsov et al. |

FOREIGN PATENT DOCUMENTS

| | | |
|---|---|---|
| JP | 2003 015899 A1 | 1/2003 |

OTHER PUBLICATIONS

Jackson, K., "Inoculan Antivirus v5.0 for Windows 95." *Virus Bulletin*, Dec. 1997, pp. 13-16.

* cited by examiner

AUTOMATIC VIRUS FIX

CROSS REFERENCE TO RELATED APPLICATIONS

This is a continuation-in-part of application Ser. No. 10/745,173, filed Dec. 23, 2003 now abandoned.

BACKGROUND OF THE INVENTION

This invention relates generally to network computing systems, and in particular to remotely managed computers. Still more particularly, the present invention relates to a method and system for dynamically repairing or immunizing a client computer from a computer virus. The invention forces the client computer to contact only a pre-authorized anti-virus server to receive an anti-virus fix for the computer virus under various modalities.

One area of background entails virtual machines and virtual machine monitors which arose out of the need to run applications written for different operating systems concurrently on a common hardware platform, or for the full utilization of available hardware resources. Virtual machine monitors were the subject of research since the late 1960's and came to be known as the "Virtual Machine Monitor" (VMM). Persons of ordinary skill in the art are urged to refer to, for example, R. P. Goldberg, "Survey of Virtual Machine Research," IEEE Computer, Vol. 7, No. 6, 1974. During the 1970's, as a further example, International Business Machines Corporation adopted a virtual machine monitor for use in its VM/370 system.

A virtual machine monitor, sometimes referred to in the literature as the "hypervisor," is a thin piece of software that runs directly on top of the hardware and virtualizes all the hardware resources of the machine. Since the virtual machine monitor's interface is the same as the hardware interface of the machine, an operating system cannot determine the presence of the VMM. Consequently, when the hardware interface is one-for-one compatible with the underlying hardware, the same operating system can run either on top of the virtual machine monitor or on top of the raw hardware. It is then possible to run multiple instances of operating systems or merely instances of operating system kernels if only a small subset of system resources are needed. Each instance is referred to as a virtual machine. The operating system can be replicated across virtual machines or distinctively different operating systems can be used for each virtual machine. In any case, the virtual machines are entirely autonomous and depend on the virtual machine monitor for access to the hardware resources such as hardware interrupts.

Another area of background involves viruses. While early computers were "stand alone" and unable to communicate with other computers, most computers today are able to communicate with other computers for a variety of purposes, including sharing data, e-mailing, downloading programs, coordinating operations, etc. This communication is achieved by logging onto a Local Area Network (LAN) or a Wide Area Network (WAN). While this expanded horizon has obvious benefits, it comes at the cost of increased exposure to mischief, particularly from viruses.

A virus is programming code that, analogous to its biological counterpart, usually infects an otherwise healthy piece of code. The virus causes an undesirable event, such as causing the infected computer to work inefficiently, or else fail completely. Another insidious feature of many viruses is their ability to propagate onto other computers on the network.

The four main classes of viruses are file infectors, system (or boot-record) infectors, worms and macro viruses. A file infector attaches itself to a program file. When the program is loaded, the virus is loaded as well, allowing the virus to execute its mischief. A system infector infects a master boot record in a hard disk. Such infection will often make the hard drive inoperable upon a subsequent re-boot, making it impossible to boot-up the computer. A worm virus consumes memory or network bandwidth, thus causing a computer to be non-responsive. A macro virus is among the most common viruses, and infects word processor programs.

Another common type of virus is aimed at browsers and e-mail. One such virus causes a Denial of Service (DoS) attack. A DoS virus causes a website to become unable to accept visitors. Usually, such attacks cause the buffer of the website to overflow, as a result of millions of infected computers being forced (unwittingly) to hit the website.

To counter viruses, anti-viral programs are written, and are constantly updated to be effective against new viruses. Such anti-viral programs are delivered either on physical media (such as CD-ROMs), or are downloaded off a network such as the Internet. Updates are typically downloaded as well, in order to provide rapid deployment of such updates. Such updates have problems and limitations, however. The most significant limitation is that such an update may not be downloadable if the client computer is already infected. That is, if the client computer has already been infected with a virus such as a system infector, then the computer will be completely unable to boot from its primary operating system, much less download an anti-viral program. Similarly, if the client computer is already infected with a worm virus, then the client computer will be non-responsive and unable to download the anti-viral program.

Another limitation is that the client computer is exposed to the network while downloading the anti-viral program. In the case of rapidly spreading viruses, this exposure can be critical, causing the client computer to be infected while looking for and/or downloading the necessary anti-viral program.

Another limitation is that downloading a software fix from an anti-viral program server requires user intervention or user action, such as accepting the download, selecting a drive and location to store the download, running the fix, often re-booting the computer after running the fix, et al. Many times the end user of the client computer will ignore a prompt or offer to download a fix, or will fail to manually perform an update check, thus leaving infected clients on a network, thus causing other client computers on the network to become infected.

SUMMARY OF THE INVENTION

What is needed, therefore, is a method and system that permits a client computer to receive an anti-viral program, even if the client computer is already infected, and to have the fix automatically installed without requiring any end-user action. Preferably, such a method and system limits network communication to that between the client computer and a pre-authorized anti-virus program server.

As will be seen, the foregoing invention satisfies the foregoing needs and accomplishes additional objectives. Briefly described, the present invention provides a method and system for downloading anti-virus programs onto a client computer.

A client computer is connected via a network that contains an anti-virus server. A signal from the anti-virus server notifies the client computer that an anti-virus needs to be immediately downloaded from the anti-virus server. The client computer disengages from the network, and re-establishes a link with only the trusted anti-virus server. The anti-virus fix is installed, the client computer re-booted, and the client computer is then allowed to reconnect to the full network. If the client's primary operating system (OS) is infected, a secondary OS in the client computer performs the anti-virus download and execution. The disengagement from the network is performed by applying a filter in a network interface card (NIC) driver by the primary OS, the secondary OS, a service processor (SP) in the client computer, or by a virtual machine monitor.

BRIEF DESCRIPTION OF THE DRAWINGS

The novel features believed characteristic of the invention are set forth in the appended claims. The invention itself, however, as well as the preferred modes of use, further purposes and advantages thereof, will best be understood by reference to the following detailed description of an illustrative embodiment when read in conjunction with the accompanying drawings, wherein:

FIG. 4b is a flow-chart of steps taken to download the anti-virus using the primary OS to reconfigure the NIC driver when the client computer is initially turned on;

FIG. 5b is a flow-chart of steps taken to download the anti-virus using the secondary OS to reconfigure the NIC driver when the client computer is initially turned on;

FIG. 6b is a flow-chart of steps taken to download the anti-virus using the SP to reconfigure the NIC driver when the client computer is initially turned on.

FIG. 7b is a flow-chart of steps taken to download the anti-virus using the VM and VMM to reconfigure the NIC driver when the client computer is initially turned on;

DETAILED DESCRIPTION OF THE ILLUSTRATIVE EMBODIMENTS

Figure 1:
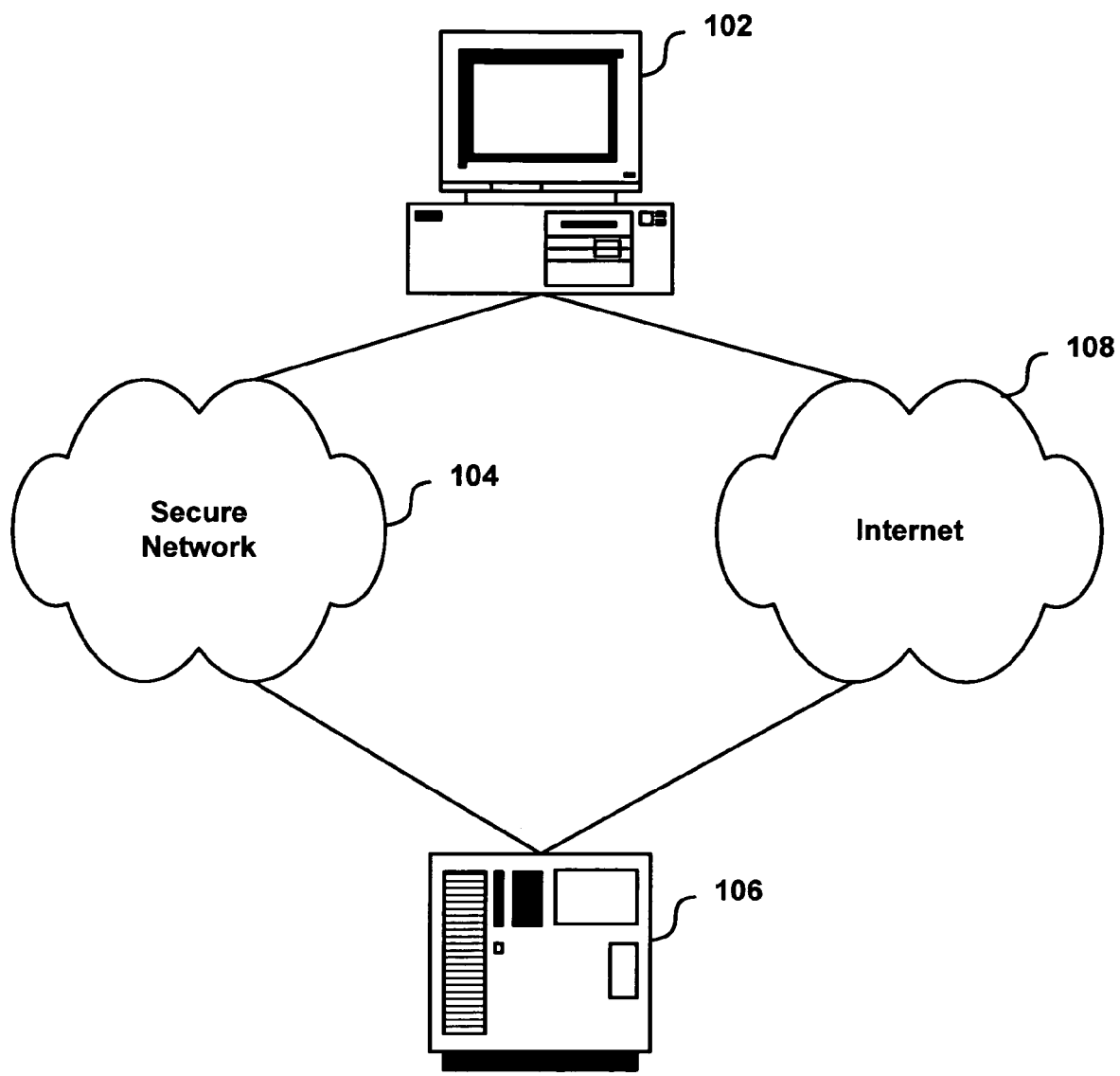
FIG. 1 depicts a schematic diagram illustrating a computer network within which the present invention may be used.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Referring now to the drawing Figures, in which like numerals indicate like elements or steps throughout the several views, a preferred embodiment of the present invention will be described. In general, the present invention provides an improved method and system for downloading anti-viruses.

With reference now to FIG. 1, there is depicted an exemplary diagram of a client computer 102 coupled to a secure network 104, which is coupled to a fix server 106. In an alternate embodiment, communication between client computer 102 and fix server 106 may be via an insecure network, such as the Internet 108.

Fix server 106 is capable of delivering (downloading) software fixes, such as patches, anti-viruses, etc. For purposes of clarity and simplicity, these software fixes will usually be referred to as "anti-viruses," although it is understood to be within the scope of the present invention that any software fix used to correct a defect in software, including a virus, an outdated version, a "bug," etc., is within the scope and vision of the present invention. Additional details of client computer 102 and fix server 106 are given below.

Figure 2:
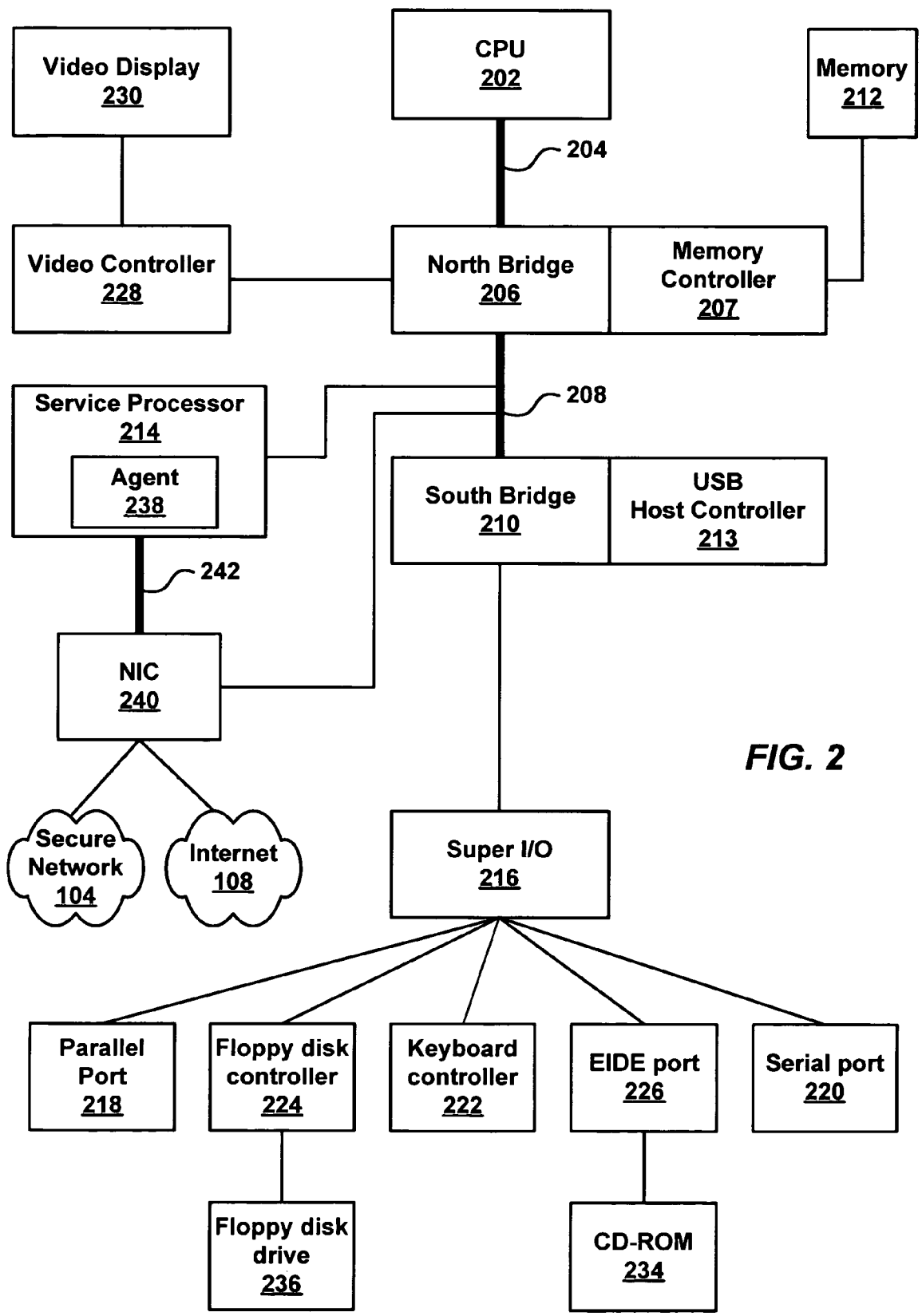
FIG. 2 illustrates an exemplary client computer that needs an anti-virus.

With reference now to FIG. 2, additional detail of client computer 102 is given. A Central Processing Unit (CPU) 202 connects via a processor interface bus 204 (also referred to in the art as a "front side bus," "host bus," or "system bus") to a North Bridge 206. North Bridge 206 is a chip or chipset arbiter logic circuit having a memory controller 207 connected to a system memory 212. A video controller 228 is coupled to North Bridge 206 and a video display 230 for viewing a graphical user interface of software operations being performed on client computer 102 by remote fix server 106. Also connected to North Bridge 206 is a high speed interconnect bus 208. North Bridge 206 is connected via interconnect bus 208, which may be a Peripheral Component Interconnect (PCI) bus, to a South Bridge 210.

South Bridge 210 is a chip or chipset Input/Output (I/O) arbiter that includes the necessary interface logic to convey signals from interconnect bus 208 to (typically slower) I/O interfaces, including a Super I/O 216. Super I/O 216 is preferably a chip or chipset including necessary logic and interfaces for a parallel port 218 and a non-USB (Universal Serial Bus) serial port 220, as are understood in the art of computer architecture. Super I/O 216 may also include controllers for non-USB devices such as a keyboard controller 222 for a non-USB keyboard and an Enhanced Integrated Device Electronics (EIDE) port 226, to which is connected to one or more Compact Disk—Read Only Memory (CD-ROM) drives 234. Also connected to Super I/O 216 is a floppy disk controller 224. Floppy disk controller 224 supports an interface with one or more floppy disk drives 236.

Coupled with South Bridge 210 is a USB host controller 213, which provides a USB interface from USB compliant devices (not shown) to client computer 102, including CPU 202. USB compliant devices may be floppy disk drives, CD-ROM drives, keyboards and other peripheral devices that are configured to comply with the "Universal Serial Bus Specification" release 2.0, Apr. 27, 2000 (USB.org), which release or later is herein incorporated by reference in its entirety. USB host controller 213, which is likewise USB compliant, may be implemented in a combination of hardware, firmware and/or software.

Communication between client computer 102 and outside networks, such as secure network 104 or non-secure Internet 108, is via a Network Interface Card (NIC) 240, which is connected to South Bridge 210 via interconnect (PCI) bus 208. Alternatively, NIC 240 is connected via a system management bus 242 to a Service Processor (SP) 214, which is connected to interconnect bus 208. SP 214 is a specialized hardware processor that can be used to configure NIC drivers for NIC 240, as described in greater detail below.

Within SP 214 is an agent 238. Agent 238 is a software program that performs a variety of tasks related to downloading anti-viruses, as described in further detail. While agent 238 is depicted as being integral with SP 214, agent 238 may alternately be stored in memory 212 or any other storage area accessible to client computer 102, particularly if client computer 102 does not have an SP 214. As will be described, Agent 238 can also be implemented entirely in hardware or partially in hardware and partially in software. Additionally, Agent 238, as described in further detail, can run as a part of a virtual machine monitor. Agent 238, in its many forms, is also known the Antidote Agent or as Antidote.

Figure 3:
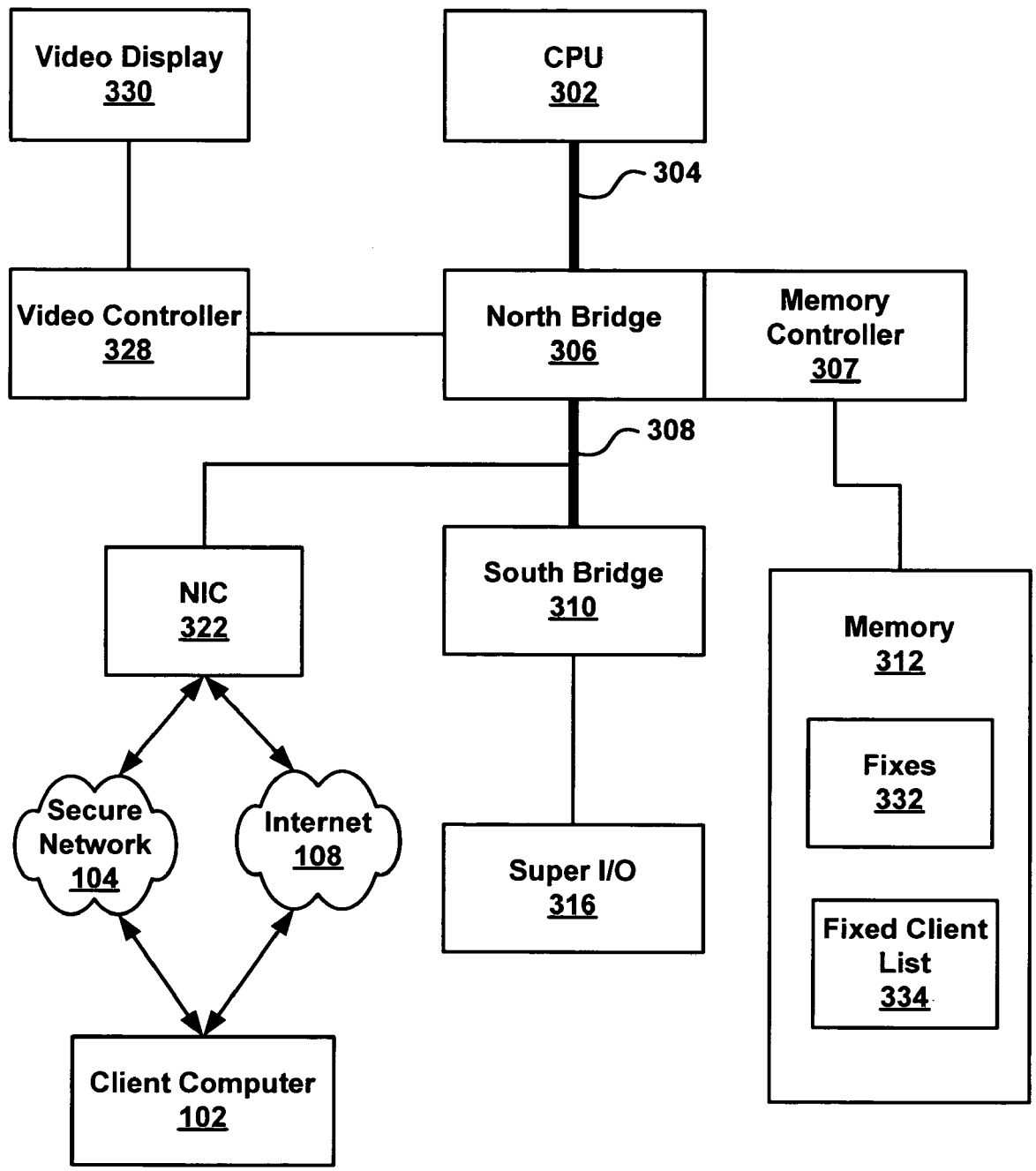
FIG. 3 depicts an exemplary fix server that supplies the anti-virus to the client computer.

With reference now to FIG. 3, there is depicted a block diagram of an exemplary fix server 106. A Central Processing Unit (CPU) 302 connects via a processor interface bus 304 (also referred to in the art as a "front side bus," "host bus," or "system bus") to a North Bridge 306. North Bridge 306 has a memory controller 307 connected to a system memory 312. Stored within system memory 312 are fixes 332, which may be any type of software fixes, including anti-virus programs, program "patches," program updates, etc. Also stored within system memory 312 is a fixed (i.e., "repaired," "updated," etc.) client list 334, which contains a listing of all client computers under fix server's 106 authority that have (or have not) received a fix stored and listed in fixes 332. Alternatively, fix server 106 may broadcast an offer to receive and execute a fix to all client computers on a network, thereby ensuring higher client coverage.

Also connected to North Bridge 306 is a high speed interconnect bus 308. Also connected to North Bridge 306 is a video controller 328, which drives a video display 330.

North Bridge 306 is connected via interconnect bus 308, which may be a Peripheral Component Interconnect (PCI) bus, to a South Bridge 310. South Bridge 310 includes the necessary interface logic to convey signals from interconnect bus 308 to a Super I/O 316. Connected to Super I/O 316 may be the types of peripherals described above with regard to Super I/O 216 in FIG. 2. Connected to interconnect bus 308 is a Network Interface Card (NIC) 322, which provides an interface, via either secure network 104 or the Internet 108, with client computer 102.

Note that the exemplary embodiments shown in FIGS. 2 and 3 are provided solely for the purposes of explaining the invention and those skilled in the art will recognize that numerous variations are possible, both in form and function. All such variations are believed to be within the spirit and scope of the present invention.

Figure 4A:
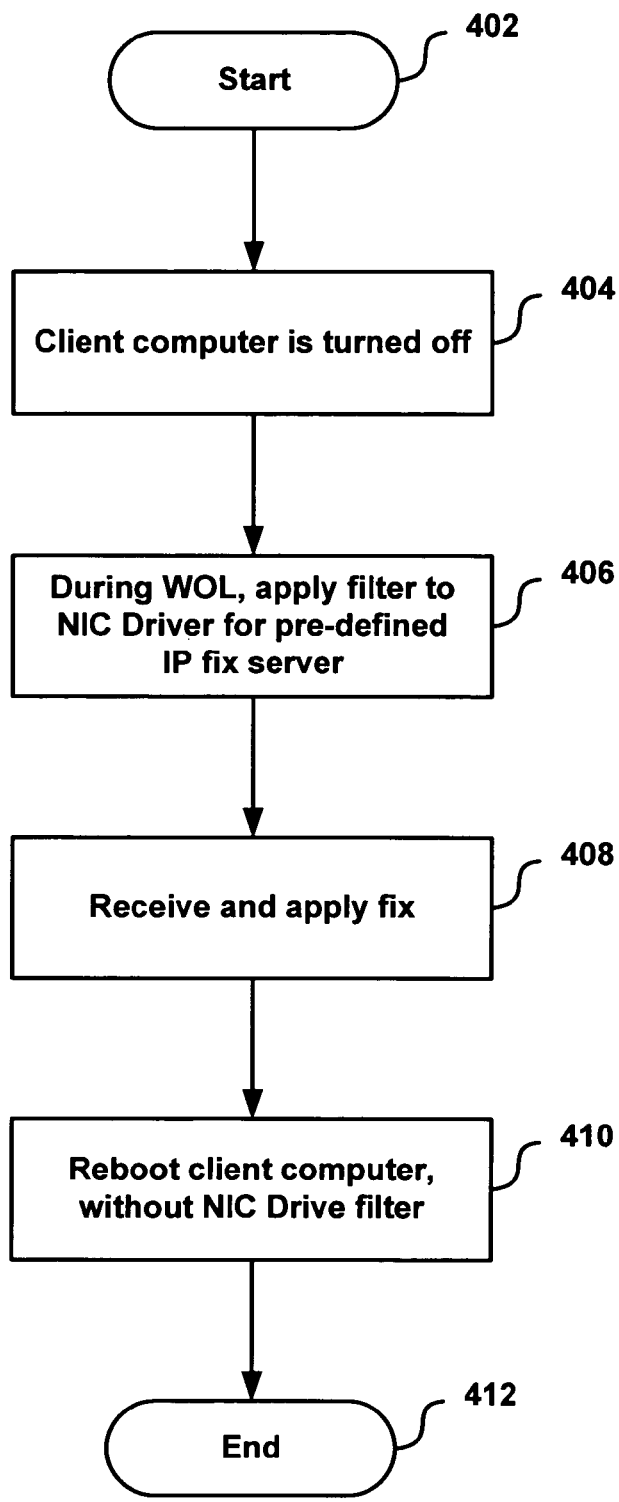
FIG. 4a is a flow-chart of steps taken to download the anti-virus using a primary operating system (OS) to reconfigure a Network Interface Card (NIC) driver, such that the NIC only communicates with the fix server, when the client computer is initially turned off.

Referring now to FIG. 4a, there is illustrated a flow-chart describing steps taken to download a fix such as an anti-virus. Proceeding from initiator step 402, a condition is assumed that the client computer is initially turned off (step 404). The fix server then wakes up the client computer, preferably using a Wake On LAN (WOL) protocol, in which a "magic packet" (message which includes sixteen sequential iterations of the client computer's Media Access Control-MAC address) received at the client computer's NIC wakes up the client computer from a reduced power state. The fix server has checked the fixed client list, and "knows" that the client computer has not received the anti-virus. Alternatively, the fix server does not care if the contacted client computer has received the fix, and simply broadcasts the offer for the fix to any client on the network. Such a broadcast preferably uses a User Datagram Protocol (UDP) formatted datagram, thus providing a checksum to verify that the fix offer has been transmitted intact.

In the preferred embodiment, during the WOL operation the magic packet includes instructions to the client computer to apply a filter to the NIC drivers allowing the NIC to communicate only with the pre-authorized fix server (step 406). The client computer then fully wakes up, and receives and applies (installs and runs) the anti-virus (step 408). The client computer is then rebooted without the NIC driver filter, allowing the client computer 410 to communicate with any other resource on the network (block 410), and the process is ended (terminator block 412).

Figure 4B:
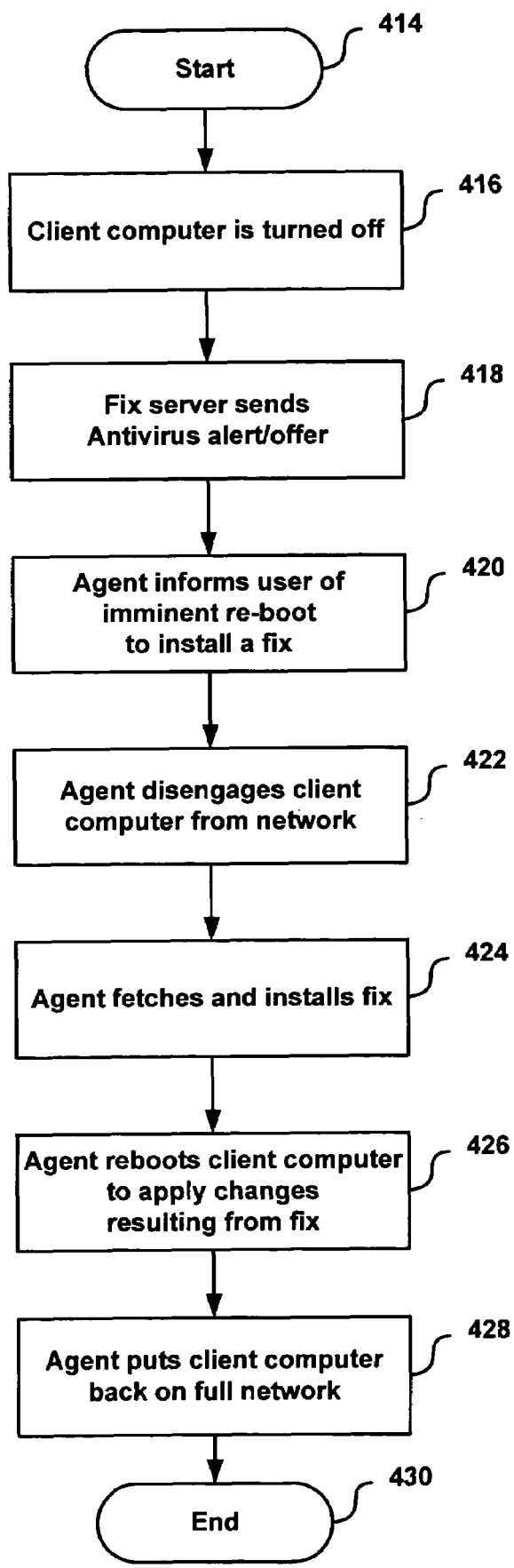

FIG. 4b depicts steps taken that are similar to those described in FIG. 4a, except that the client computer is initially turned on (blocks 414 and 416). The fix server sends an anti-virus alert to client computer (block 418). An agent stored in the client computer informs the user of the client computer that an imminent re-boot is about to occur, in order to force the downloading of an anti-virus (block 420). The agent then disengages the client computer from the network (block 422), permitting the NIC to communicate with only the fix server, as described above in FIG. 4a. The agent fetches the anti-virus (fix) from the fix computer and installs it (block 424). The agent then re-boots the client computer, applying the changes prompted by the anti-virus fix (block 426), and the client computer is put back on line with the entire network (blocks 428 and 430).

Figure 5A:
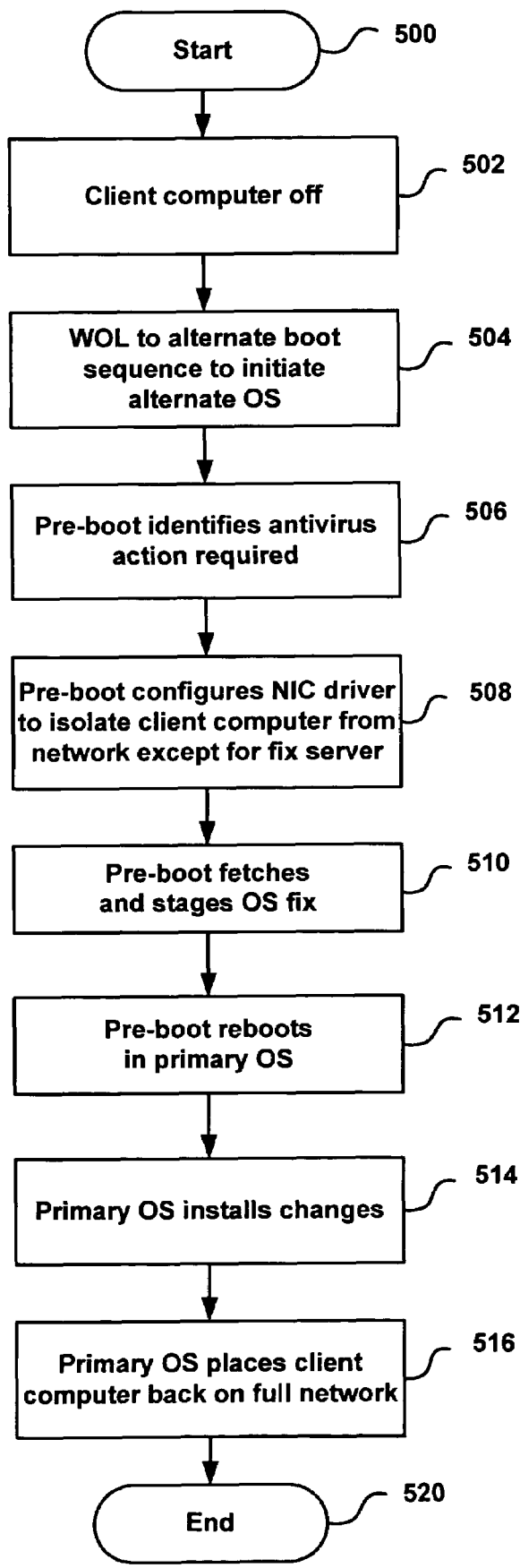
FIG. 5a is a flow-chart of steps taken to download the anti-virus using a secondary OS to reconfigure the NIC driver when the client computer is initially turned off.

While the process described in FIGS. 4a-b is usually be effective, there may be occasions in which the primary OS has been corrupted to the point of being inoperable or non-responsive. The method depicted in FIGS. 5a-b address this situation. Referring now to FIG. 5a, assume first that the client computer is initially turned off (blocks 500 and 502). The fix computer sends a Wake-on-LAN (WOL) packet to the client computer (block 504). The packet includes instructions to the client computer to pre-boot from an alternate OS, if present, in the client computer, rather than the client computer's primary OS. (If an alternate OS is not present, then the client computer receives the fix as described in FIG. 4a.) This pre-boot operation identifies what anti-virus action is required (block 506) according to the anti-virus sent in the packet from the fix server.

The pre-boot configures the pre-boot NIC driver to communicate only with the fix server (block 508). The secondary OS's pre-boot fetches the anti-virus from the fix server, and stages fixes an installs changes (e.g., new drivers, flags, settings, etc.) in the primary OS (block 510). That is, the pre-boot of the secondary OS repairs, the primary OS while the primary OS is inactive. The pre-boot of the secondary OS then reboots the primary OS (block 512), and the primary OS completes available changes (new drivers, flags, settings, etc.) according to the anti-virus instructions (block 514). The primary OS then fully boots up the client computer, including setting the NIC driver to allow unfettered communication with any computer on the network (blocks 516 and 518).

Figure 5B:
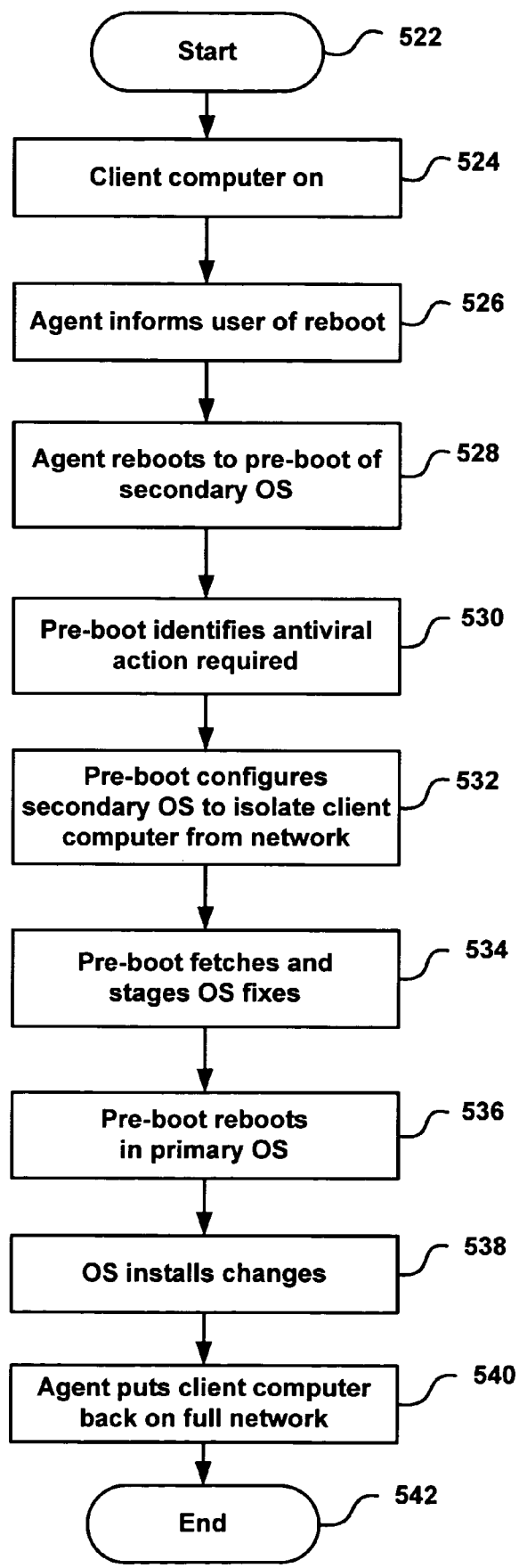

FIG. 5b describes a similar procedure as shown in FIG. 5a, except that the computer is initially turned on (blocks 522 and 524). Upon receipt of an anti-virus packet received from the fix server, the client computer's agent informs a user of the client computer that a re-boot is imminent (block 526), allowing the user to shut down the computer, or else be aware that the client computer will automatically shut down (after saving data, settings, etc.). The client computer's agent program then reboots to the pre-boot of the secondary OS (block 528). The pre-boot receives the anti-virus and identifies what action is required by the anti-viral instructions (block 530).

The pre-boot configures the secondary OS to isolate the client computer from the network by resetting the NIC drivers in a manner that only the fix server can be contacted (block 532). The NIC the fetches the anti-virus from the fix server, and makes appropriates staging and changes installation in the primary OS (block 534). The pre-boot of the secondary OS then reboots in the primary OS (block 536), the primary OS installs requisite changes, if necessary, according to the downloaded anti-virus (block 538), and the agent then puts the client computer back on the full network by re-setting the NIC drivers (blocks 540 and 542).

Figure 6A:
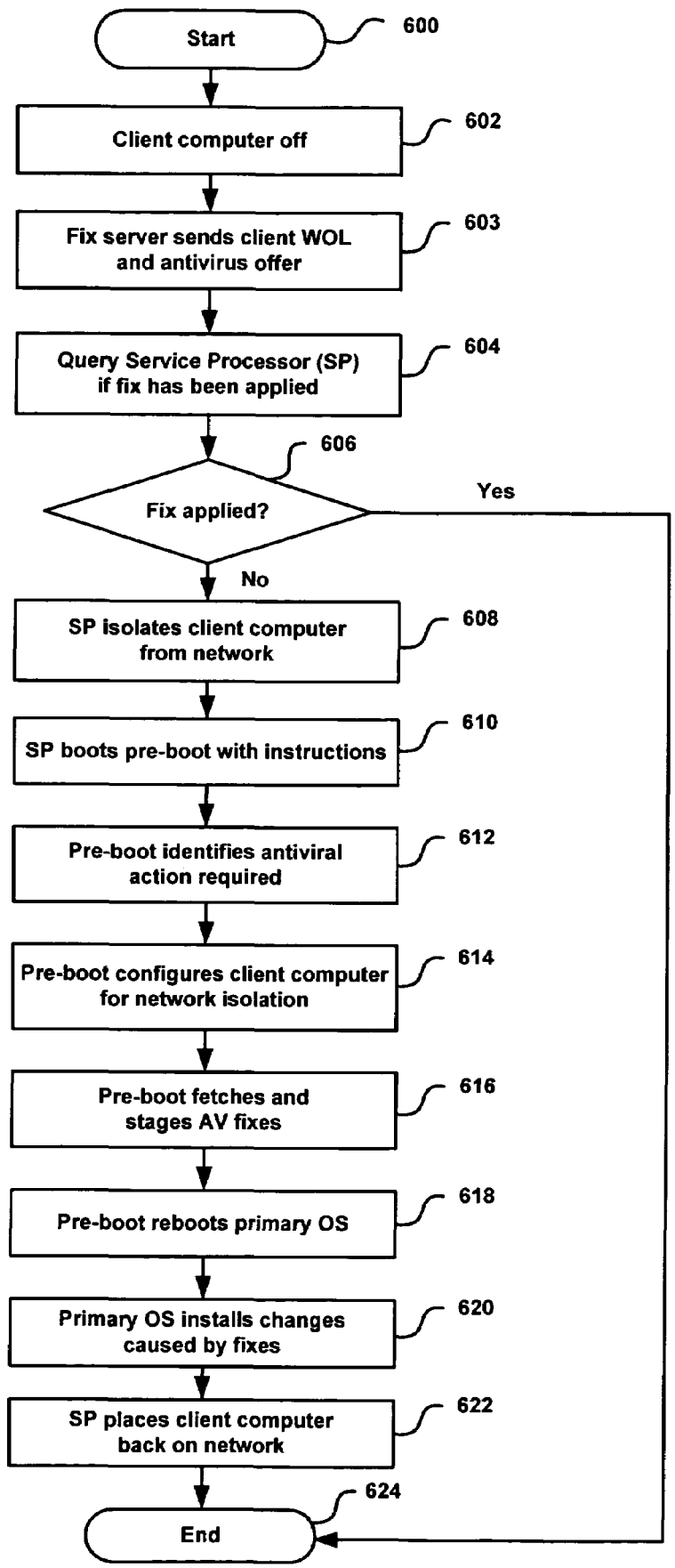
FIG. 6a is a flow-chart of steps taken to download the anti-virus using a hardware Service Processor (SP) to reconfigure the NIC driver when the client computer is initially turned off.

The two methods above have a limitation that there may be occasions in which the primary and secondary OS are both corrupted by the virus. Such a situation is addressed by the process described in FIGS. 6a-b. Referring now to FIG. 6a, assume that the client computer is initially turned off (blocks 600 and 602). The fix server sends a packet including a fix (anti-virus) as well as WOL signal to the client computer. A service processor (SP) in the client computer, described above in FIG. 2, queries software and memory in client computer 102 to see if the client computer has already installed the sent anti-virus (block 604). If not (query block 606), completely isolates the client computer from the network (block 608). The SP then boots the pre-boot of the primary OS with instructions pre-stored in the SP (block 610), and identifies antiviral actions required by the instructions (block 612).

The SP then resets the NIC drivers to communicate only with the fix server (block 614). That is, the SP performs the NIC driver setting operation that was performed by the OS's described in FIGS. 4 and 5, but with the use of hardware only, which is impervious to viruses since it is isolated from viral attack. The pre-boot fetches and stages the anti-viral fixes (block 616), and reboots the primary OS (block 618). The primary OS installs the changes causes by the anti-virus (block 620), and the client computer is put back on full line on the network by the SP (blocks 622 and 624).

Figure 6B:
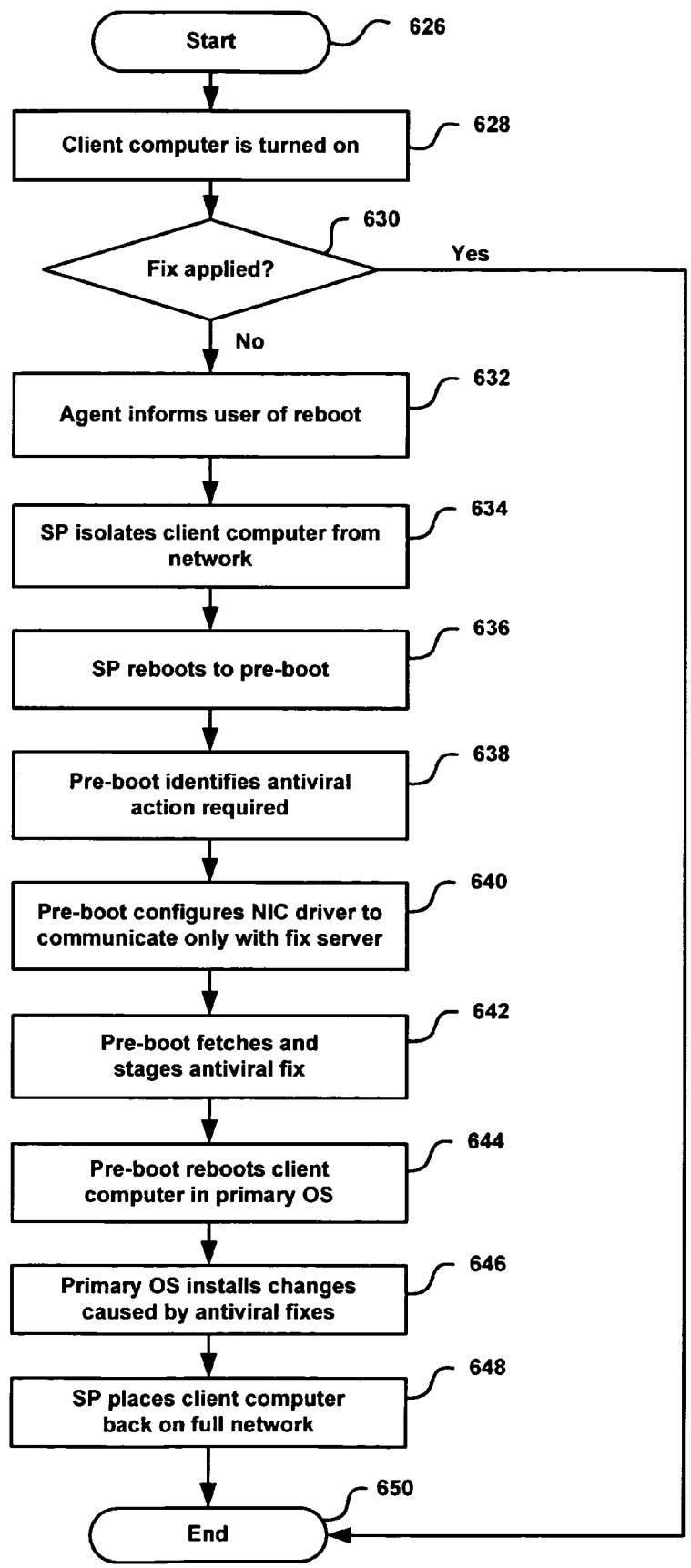

FIG. 6b addresses a similar condition as addressed in FIG. 6a, but the client computer is initially running (blocks 626 and 628). If the agent in the client computer determines that the anti-virus being offered by the fix server has not been previously downloaded (query block 630), then the agent informs the user of the client computer that a forced re-boot is imminent (block 632). The SP totally isolates the client computer from the network by disabling the NIC (block 634), and the SP reboots to pre-boot in the primary (or alternately in the secondary) OS.

The pre-boot in the OS identifies what antiviral action is required (block 638), and then configures the NIC drivers to communicate only with the fix server (block 640). The pre-boot fetches and stages the anti-virus (block 642), and then re-boots in the primary OS (block 644). The primary OS installs the changes causes by the anti-virus (block 646), and the SP puts the client computer back on the full network (blocks 646 and 650).

An embodiment of the invention with an even higher level of security can be implemented by utilizing the "virtual machine monitor" and associated "virtual machine" technologies referred to in the background section. This can be implemented by modifying the virtual machine monitor according to the example given below with reference to FIGS. 7a and 7b. These modifications can be applied to currently available virtualization software executed by CPU 202 out of memory 212, such as the ESX Server software product by VMware Corp. Additionally, for a higher level of security, support for virtualization can be built into any or all of CPU 202, North Bridge 206, and Memory Controller 207. For example, any of these components can be modified to physically block inter-memory access for different virtual machines, contain redundant hardware for virtualization purposes, and provide specialized access including encrypted access to hardware resources. Moreover, it is well known in the art that software components can be readily implemented as hardware and visa-versa. Accordingly, alternative embodiments can include portions of the virtual machine manager itself, which can be implemented in any or all of CPU 202, North Bridge 206, and Memory Controller 207.

Figure 7A:
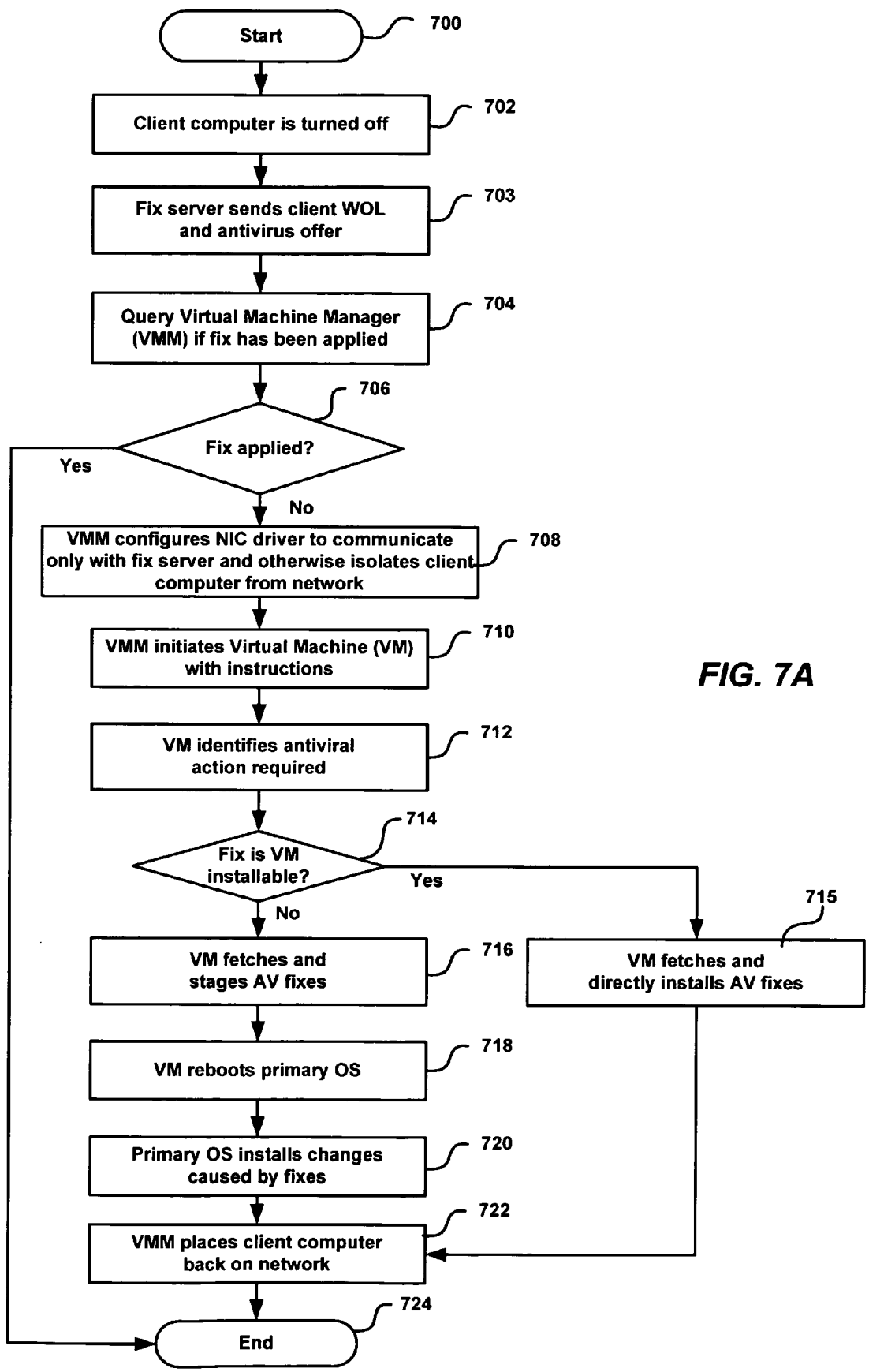
FIG. 7a is a flow-chart of steps taken to download the anti-virus using a virtual machine (VM) and virtual machine monitor (VMM) to reconfigure the NIC driver when the client computer is initially turned off.

Referring now to FIG. 7a and assuming that the client computer is initially turned off (blocks 700 and 702). The fix server sends a packet including a fix (anti-virus) as well as WOL signal to the client computer. A virtual machine monitor (VMM), rather than the SP 214 of FIG. 2, can perform the functions described relative to agent 238 in the client computer to query software and memory in client computer 102 to see if the client computer has already installed the sent anti-virus (block 704). If not (query block 706), the VMM then resets the NIC drivers to communicate only with the fix server and otherwise completely isolates the client computer from the network (block 708). That is, the VMM performs the NIC driver setting operation that was performed by the OS's described in FIGS. 4 and 5, but with the use of the VMM and the main processor, both of which are impervious to viruses since they are isolated from viral attack. Moreover, any of the known methods of network isolation (block 708) can be used including application of a filter or mask to any level of communication code ranging from the driver level all the way to the UDP or TCP/IP level or higher. The VMM then initiates a virtual machine (VM) with instructions pre-stored in the VMM (block 710), and identifies antiviral actions required by the instructions (block 712). As an alternative to initiating a VM, the VMM can perpetually maintain an active VM just for this purpose and transfer control to the VM when corrective action is required.

If the fixes are installable by the VM (or alternately the VMM) directly (decision block 714), the VM fetches and directly installs the anti-viral fixes (block 715), and the client computer is put back on full line on the network by the VMM (blocks 722 and 724). Otherwise, the VM fetches and stages the anti-viral fixes (block 716), and reboots the primary OS (block 718). The primary OS installs the changes causes by the anti-virus (block 720), and the client computer is put back on full line on the network by the VMM (blocks 722 and 724).

Figure 7B:
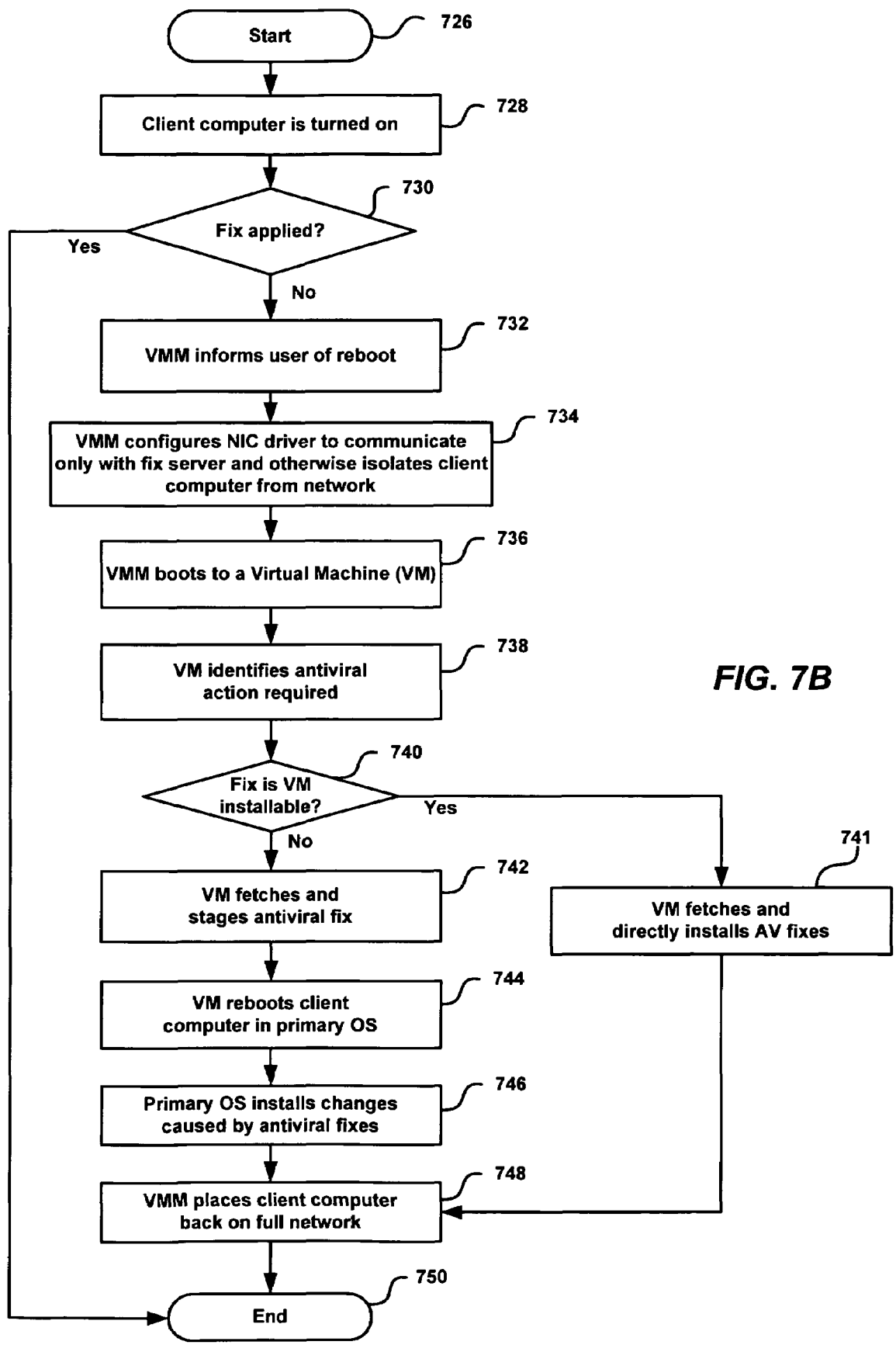

FIG. 7b addresses a similar condition as addressed in FIG. 7a, but the client computer is initially running (blocks 726 and 728). If the VMM determines that the anti-virus being offered by the fix server has not been previously downloaded (query block 730), then the VMM informs the user of the client computer that a forced re-boot is imminent (block 732). The VMM then resets the NIC drivers to communicate only with the fix server and otherwise completely isolates the client computer from the network (block 734), and the VMM invokes a VM or transfers control to a perpetual VM as described above.

The VM identifies what antiviral action is required (block 738). If the fixes are directly installable by the VM (or the VMM) (decision block 740), the VM fetches and directly installs the anti-viral fixes (block 741), and the client computer is put back on full line on the network by the VMM (blocks 748 and 750). Otherwise, the VM fetches and stages the anti-virus (block 742), and then re-boots in the primary OS (block 744). The primary OS installs the changes caused by the anti-virus (block 746), and the VMM puts the client computer back on the full network (blocks 748 and 750).

Figure 8:
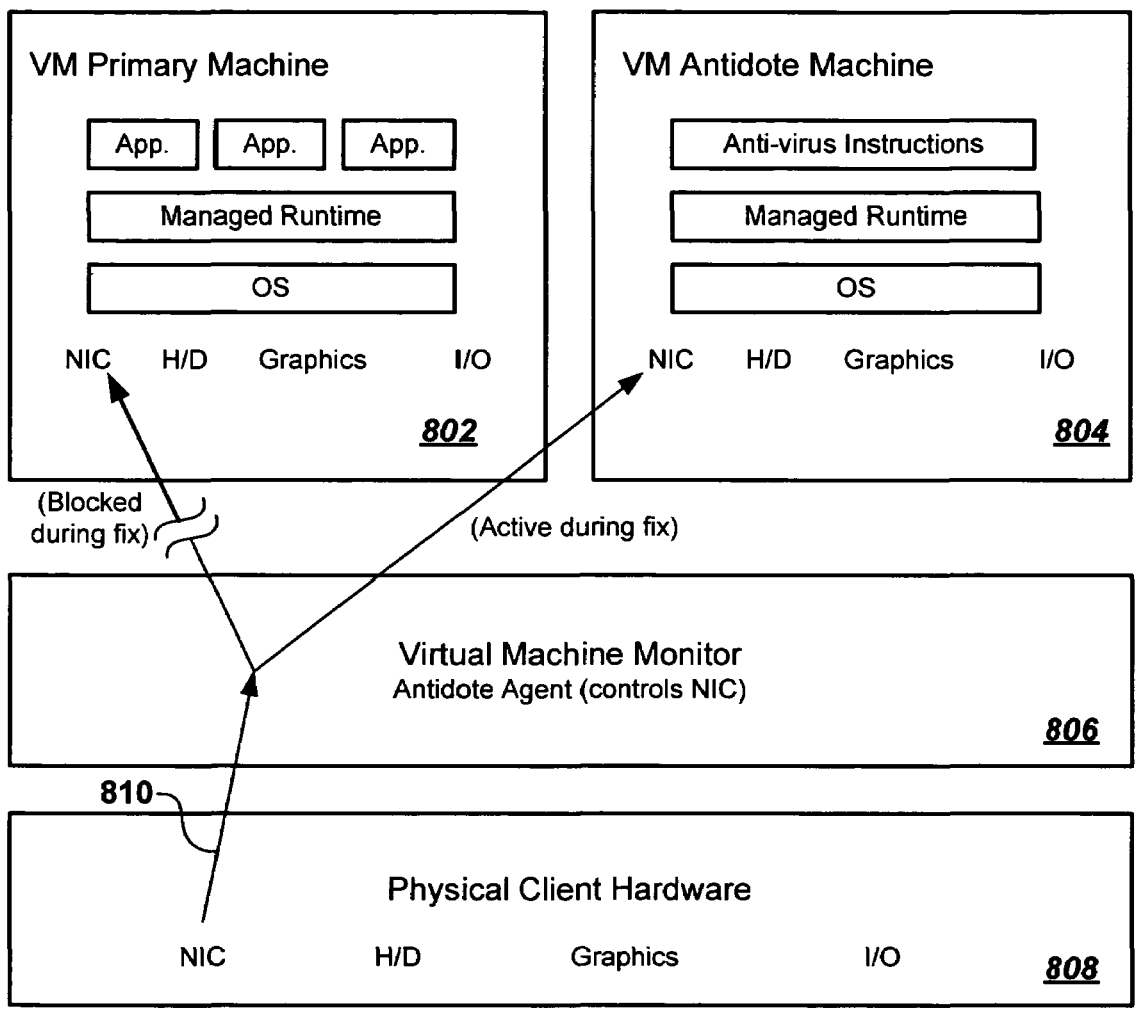
FIG. 8 is a system virtualization layer diagram showing the abstraction layers in a client running virtualitation software which includes a virtual machine monitor.

FIG. 8 is a system virtualization layer diagram showing the abstraction layers in a client running virtualitation software which includes a virtual machine monitor. At the lowest level of abstraction is the hardware layer 808; this is the physical hardware layer of the client machine. A Virtual Machine Monitor layer 806 is an intermediary layer which sits on top of the hardware layer 808 and intercepts all access attempts to the physical hardware by software running on the client machine. It is within the Virtual Machine Monitor layer 806 that the Antidote Agent 238 runs and is executed as part of the virtual machine monitor and as such has all the security and isolation features of the virtual machine monitor. At the highest level of abstraction lie the virtual machines 802 and 804 which ultimately run operating systems and software applications. Virtual machines can be configured so as to know not of the existence of other virtual machines; they can be isolated and autonomous as would be the case for virtual machine 804 which executes the anti-virus instructions provided by and under the control of the Antidote Agent 238 from the Virtual Machine Monitor layer 806. Arrows 810 indicate the isolation of the NIC to virtual machine 802 during a virus fix operation while allowing VM Antidote machine 804 to communicate only with the fix server as described above relative to FIGS. 7a and 7b.

Using the VM Antidote Machine 804 under the control of the Antidote Agent running as part of the virtual machine monitor in layer 806 allows for the control and monitoring of all communications present in the client computer, including Modem, WAN, WLAN, Serial Port, USB and other ports. This embodiment is both immune from attack and utilizes the primary CPU 202 and the entire client computer for fix/patch management if desired.

In a preferred embodiment, client computer 102 monitors, using any known system monitoring software and/or hardware, whether client computer 102 can configure the NIC 240 as described above using a primary OS, a secondary OS, a Service Processor, such as SP 214, or a virtual machine manager. That is, if the client computer 102 has a virtual machine manager, then the first choice is to use the virtual machine manager to run the Antidote Agent in a manner described in FIGS. 7a-8. If client computer has an SP 214, then the second choice is to use SP 214 to configure NIC 240 in a manner described in FIGS. 6a-b. If client computer 214 does not have an SP 214, then the NIC 240 is configured using a secondary (alternate) OS, as described in FIGS. 5a-b. Finally, if the client computer 214 does not have an alternate OS, then the NIC 240 is configured as described in FIGS. 4a-b.

Embodiments of the present invention include various functions, which have been described above with reference to FIGS. 4a-8. The functions may be performed by hardware components or may be embodied in machine-executable instructions, which may be used to cause a general-purpose or special-purpose processor programmed with the instructions to perform the functions. Alternatively, the functions may be performed by a combination of hardware and software.

Figure 9:
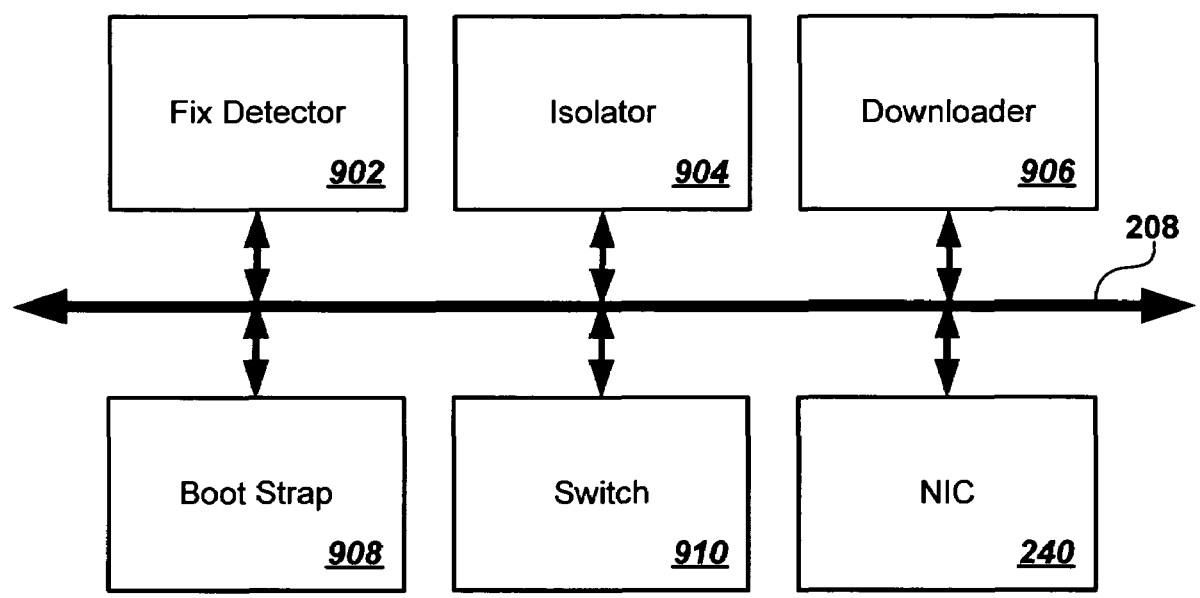
FIG. 9 is a block diagram of an embodiment in which various functions of FIGS. 4a-8 are performed in hardware.

FIG. 9 is a block diagram of an embodiment in which various functions of FIGS. 4a-8 are performed in hardware. Fix detector 902, Isolator 904, Downloader 906, Boot Strap 908, Switch 910, and NIC 240 of FIG. 2 are all coupled to the high speed interconnect (PCI) bus 208. Fix detector 902 discerns an offer for a software fix from a fix server as described with respect to any of the previously described embodiments. Isolator 904 is responsible for controlling and isolating NIC 240 such that communication can only occur with the fix server upon a receipt of the offered software fix. Isolator 904 can perform the isolation function according to any of the embodiments previously described. Downloader 906 functions to effect the transfer of the software fix from the fix server to the client computer according to any of the above described embodiments. Boot strap 908 reboots the client computer according to any previous embodiment after the software fix has been downloaded and executed. Isolator 904 reconnects the client computer to the network without restrictions after the software fix is loaded and executed. Switch 910 selects the best method according to availability of a primary OS, a secondary OS, a Service Processor, such as SP 214, or a virtual machine manager as described above.

An Embodiment of the present invention may be provided as a computer program product which may include a machine-readable medium having stored thereon instructions which may be used to program a computer (or other electronic devices) to perform a process according to the any of the embodiments of the present invention. The machine-readable medium may include, but is not limited to, floppy diskettes, optical disks, CD-ROMs, and magneto-optical disks, ROMs, RAMs, EPROMs, EEPROMs, magnet or optical cards, or other type of media\machine-readable medium suitable for storing electronic instructions. Moreover, an embodiment of the present invention may also be downloaded as a computer program product, wherein the program may be transferred from a remote computer to a requesting computer by way of data signals embodied in a carrier wave or other propagation medium via a communication link (e.g., a modem or network connection).

The present invention has been described in relation to particular embodiments that are intended in all respects to be illustrative rather than restrictive. Although specific terms are used, the description thus given uses terminology in a generic and descriptive sense only and not for purposes of limitation. Alternative embodiments will become apparent to those skilled in the art to which the present invention pertains without departing from its spirit and scope. Accordingly, the scope of the present invention is defined by the appended claims rather than the foregoing discussion.

We claim as our invention:

1. A method comprising:
    configuring a network interface of a client computer to communicate only with a fix server that can supply a software fix to the client computer; and
    receiving from the fix server the software fix, wherein the client computer communicates only with the fix server when a determination is made that the client computer has not previously received the software fix.

2. The method of claim 1, wherein the software fix is automatically forced on the client computer to be received and applied on the client computer without a user intervention.

3. The method of claim 2, wherein the software fix is received in a broadcasted packet from the fix server.

4. The method of claim 1, further comprising:
    waking up the client computer with a Wake-On-LAN (WOL) signal, the WOL signal being included in a packet from the fix server, the packet from the fix server including the address of the fix server.

5. The method of claim 1, wherein the method is under the control of an agent in the client computer.

6. The method of claim 1, farther comprising:
    re-booting the client computer after installing the software fix; and
    reconnecting the client computer to a network in a full access mode.

7. The method of claim 1, further comprising:
    upon receiving the software fix from the fix server, re-booting the client computer using a secondary operating system in the client computer.

8. The method of claim 1, further comprising:
    utilizing a service processor in the client computer to reconfigure a Network Interface Card (NIC) driver, wherein the NIC is configured to communicate only with the fix server to receive the software fix.

9. The method of claim 1, further comprising:
determining whether the client computer has any of a virtual machine manager, a primary operating system, a secondary operating system, and a service processor, and upon said determination, utilizing the virtual machine manager to control the network interface if the client computer has a virtual machine manager, or else utilizing the service processor to control the network interface if the client computer has a service processor, or else utilizing the secondary operating system to control the network interface if the client computer has a secondary operating system, or else utilizing the primary operating system to control the network interface.

10. A client computer comprising:
a fix detector which discerns an offer for a software fix from a fix server;
an isolator which is operatively coupled to said fix detector and which controls a network interface to only communicate with the fix server upon a receipt of the offered software fix;
a downloader which is operatively coupled to said isolator and which transfers the software fix from the fix server; and
a boot strap which is operatively coupled to said downloader and which reboots the client computer after the software fix has been downloaded and executed;
wherein the client computer is reconnected to a network without restrictions after the software fix is loaded and executed in the client computer.

11. The client computer of claim 10, wherein said isolator utilizes a primary operating system.

12. The client computer of claim 10, wherein said isolator utilizes a secondary operating system, wherein upon receipt of the offered software fix, the client computer re-boots using the secondary operating system.

13. The client computer of claim 10, wherein said isolator is a service processor.

14. The client computer of claim 13, wherein the service processor includes an agent for detecting the offer for the software fix.

15. The client computer of claim 10, further comprising a switch which is operatively coupled to said fix detector and which determines whether the client computer has a capability of controlling the network interface using any of a virtual machine monitor, a primary operating system, a secondary operating system, and a service processor, and upon making the determination, utilizing the virtual machine monitor if available, or else utilizing the service processor if the virtual machine manager is not available, or else utilizing the secondary operating system if the service processor is not available, or else utilizing the primary operating system if the secondary operating system is not available, to control the network interface.

16. The client computer of claim 10, wherein said boot strap pre-boots the client computer using a secondary operating system to download and execute the software fix.

17. The client computer of claim 10, wherein the software fix is an anti-virus software program.

18. A method comprising:
configuring a network interface of a client computer to communicate only with a fix server that can supply a software fix to the client computer; and
receiving from the fix server the software fix, wherein the client computer communicates only with the fix server when a determination is made that the client computer has not previously received the software fix;
wherein said configuration and said reception are performed by a virtual machine manager in the client computer.

19. The method of claim 18, wherein at least a portion of the virtual machine manager is implemented in hardware.

20. The method of claim 18, further comprising:
upon receiving the software fix from the fix server, executing the software fix directly from the virtual machine manager.

21. The method of claim 18, further comprising:
upon receiving the software fix from the fix server, executing the software fix using a virtual machine in the client computer, wherein the virtual machine is created by the virtual machine manager.

22. The method of claim 18, further comprising:
utilizing the virtual machine manager in the client computer to reconfigure a Network Interface Card (NIC) driver, wherein the NIC is configured to communicate only with the fix server to receive the software fix.

23. The method of claim 18, further comprising:
re-booting the client computer after installing the software fix; and
reconnecting the client computer to a network in a full access mode.

24. Apparatus comprising:
a memory;
a network interface; and
a processor which couples said memory and said network interface and is effective when executing code stored in said memory to establish a virtual machine manager which virtualizes the hardware interface of at least said network interface;
wherein the virtual machine manager established by said processor is effective to:
configure said network interface to communicate only with a fix server that can supply a software fix; and
receive from the fix server the software fix, wherein communication only occurs with the fix server when a determination is made that a software fix has not been previously received.

25. Apparatus of claim 24, wherein the software fix is executed directly by the virtual machine manager in response to the reception of the software fix from the fix server.

26. Apparatus of claim 24, wherein the virtual machine manager initiates a virtual machine instance and wherein the software fix is executed by the virtual machine instance in response to the reception of the software fix from the fix server.

27. Apparatus of claim 24, wherein the virtual machine manager is farther effective to reconfigure a Network Interface Card (NIC) driver, wherein the NIC is configured to communicate only with the fix server to receive the software fix.

28. Apparatus of claim 24, wherein the virtual machine manager is further effective to:
re-boot the client computer after installing the software fix; and
reconnect the client computer to a network in a full access mode.

29. Apparatus comprising:
a memory;
a network interface; and
a processor which couples said memory and said network interface and is effective to establish a virtual machine manager which virtualizes the hardware interface of at least said network interface;

wherein the virtual machine manager established by said processor is effective in executing code stored in said memory to:

configure said network interface to communicate only with a fix server that can supply a software fix by applying a filter to software associated with said network interface;

receive from the fix server the software fix, wherein communication only occurs with the fix server when a determination is made that a software fix has not been previously received;

initiate a virtual machine instance wherein the software fix is executed by the virtual machine instance in response to the reception of the software fix from the fix server;

re-boot the client computer after installing the software fix; and reconnect the client computer to a network in a full access mode.

30. The method of claim 29, wherein at least a portion of the virtual machine manager is implemented in hardware.

31. A product comprising:

a computer usable medium having computer readable program code stored therein, the computer readable program code in said product being effective to:

configure said network interface to communicate only with a fix server that can supply a software fix; and receive from the fix server the software fix, wherein communication only occurs with the fix server when a determination is made that a software fix has not been previously received.

* * * * *

UNITED STATES PATENT AND TRADEMARK OFFICE
CERTIFICATE OF CORRECTION

PATENT NO. : 7,587,765 B2  Page 1 of 1
APPLICATION NO. : 10/827165
DATED : September 8, 2009
INVENTOR(S) : Challener et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1544 days.

Signed and Sealed this

Twenty-first Day of September, 2010

David J. Kappos
*Director of the United States Patent and Trademark Office*